(12) United States Patent
Pertlik et al.

(10) Patent No.: US 9,434,423 B2
(45) Date of Patent: Sep. 6, 2016

(54) FASTENING ASSEMBLY FOR MOUNTING COMPONENTS AND OFF-ROAD UTILITY VEHICLE HAVING A FASTENING ASSEMBLY

(75) Inventors: Rudolf Pertlik, Vienna (AT); Norbert Theil, Vienna (AT)

(73) Assignee: MAN Truck & Bus Oesterreich AG, Steyr (AT)

( * ) Notice: Subject to any disclaimer, the term of this patent is extended or adjusted under 35 U.S.C. 154(b) by 618 days.

(21) Appl. No.: 13/295,275

(22) Filed: Nov. 14, 2011

(65) Prior Publication Data
US 2012/0119535 A1    May 17, 2012

(30) Foreign Application Priority Data

Nov. 12, 2010   (AT) .............................. A 1866/2010

(51) Int. Cl.
| | | |
|---|---|---|
| *B62D 27/06* | (2006.01) | |
| *B62D 21/02* | (2006.01) | |
| *B60G 7/02* | (2006.01) | |

(52) U.S. Cl.
CPC .............. *B62D 27/065* (2013.01); *B60G 7/02* (2013.01); *B62D 21/02* (2013.01); *B60G 2204/4302* (2013.01); *B60G 2206/601* (2013.01)

(58) Field of Classification Search
CPC ...... B62D 21/02; B62D 21/09; B62D 21/11; B62D 21/17
USPC ............ 296/30, 203.01, 204, 205; 52/787.1; 280/797
See application file for complete search history.

(56) References Cited

U.S. PATENT DOCUMENTS

| | | | | |
|---|---|---|---|---|
| 2,327,585 | A * | 8/1943 | Ulrich .......................... | 52/787.1 |
| 3,266,591 | A * | 8/1966 | Sampietro et al. .......... | 180/68.1 |
| 5,259,660 | A * | 11/1993 | Haesters ....................... | 296/204 |
| 5,560,674 | A * | 10/1996 | Tazaki et al. ............. | 296/193.01 |
| 6,237,304 | B1 * | 5/2001 | Wycech ......................... | 52/847 |
| 6,269,902 | B1 * | 8/2001 | Miyagawa .................... | 180/312 |
| 6,962,390 | B1 * | 11/2005 | Myers et al. ................. | 296/205 |
| 7,201,398 | B1 * | 4/2007 | Christofaro et al. ......... | 280/781 |
| 7,334,958 | B2 * | 2/2008 | Muller et al. ................. | 403/168 |
| 7,686,387 | B2 * | 3/2010 | Yustick et al. ................ | 296/205 |
| 8,366,150 | B2 * | 2/2013 | Parsons et al. ............... | 280/797 |
| 2011/0133519 | A1 * | 6/2011 | Caliskan et al. .............. | 296/204 |

FOREIGN PATENT DOCUMENTS

| | | |
|---|---|---|
| DE | 10257222 A1 | 6/2004 |
| DE | 102004038487 A1 | 3/2006 |
| DE | 102005028309 A1 | 12/2006 |
| DE | 102006018360 A1 | 10/2007 |
| DE | 102008009292 A1 | 8/2009 |
| DE | 102009016849 A1 | 10/2010 |
| GB | 109839 A | 9/1917 |
| WO | 2007118780 A1 | 10/2007 |

\* cited by examiner

*Primary Examiner* — Jason S Daniels
(74) *Attorney, Agent, or Firm* — Laurence A. Greenberg; Werner H. Stemer; Ralph E. Locher

(57) ABSTRACT

A fastening assembly fastens at least one component part to a vehicle frame. The vehicle frame includes a first, preferably closed cross-sectional profile. At least one carrier for a fastening device includes a second cross-sectional profile. The carrier extends from a first internal surface of the vehicle frame to at least a second internal surface of the vehicle frame and provides an opening for carrying the fastening device. An off-road utility vehicle having at least one fastening assembly is also provided.

13 Claims, 4 Drawing Sheets

FASTENING ASSEMBLY FOR MOUNTING COMPONENTS AND OFF-ROAD UTILITY VEHICLE HAVING A FASTENING ASSEMBLY

CROSS-REFERENCE TO RELATED APPLICATION

This application claims the priority, under 35 U.S.C. §119, of Austrian Patent Application A 1866/2010, filed Nov. 12, 2010; the prior application is herewith incorporated by reference in its entirety.

BACKGROUND OF THE INVENTION

Field of the Invention

The present invention relates to a fastening assembly for fastening at least one mounted part to a vehicle frame. The vehicle frame includes a first, preferably closed cross-sectional profile. The vehicle, in this case, is a utility vehicle, for example. In addition, the invention relates to an off-road utility vehicle having a vehicle frame which includes a closed cross-sectional profile.

Utility vehicles which have a vehicle frame formed of longitudinal members with open or closed cross-sections, are already known in the prior art. In the prior art, bolted connections are preferably utilized in that case for fastening components of the vehicle to the vehicle frame. In the case of open cross-sectional profiles, for that purpose, drilled holes or bores are disposed in the longitudinal members of the vehicle frame to enable the components intended for fastening to be subsequently fastened thereto, preferably through the use of bolted connections extending through the drilled holes or bores.

An associated disadvantage is that, on one hand, deficiencies with regard to the strength and, on the other hand, deficiencies with regard to the tightness, are evident in conjunction with the use of longitudinal frame members with closed cross-sectional profiles.

SUMMARY OF THE INVENTION

It is accordingly an object of the invention to provide a fastening assembly for mounting components and an off-road utility vehicle having a fastening assembly, which overcome the hereinafore-mentioned disadvantages and at least partially resolve the problems of the heretofore-known assemblies and vehicles of this general type.

With the foregoing and other objects in view there is provided, in accordance with the invention, a fastening assembly, comprising a vehicle frame for at least one component part or mounted part to be fastened to the vehicle frame. The vehicle frame has first and second internal surfaces and a first, preferably closed cross-sectional profile. At least one carrier has an opening for carrying or accommodating a fastening device. The at least one carrier extends from the first internal surface to at least the second internal surface and the at least one carrier has a second cross-sectional profile.

The invention relates to vehicle frames which are formed of longitudinal vehicle members and transverse vehicle members. In this case, the longitudinal vehicle members or transverse vehicle members according to the invention at least partially include a closed cross-sectional profile. Supporting profiles of that kind are used, in particular, in the case of highly stressed vehicles, such as construction vehicles or off-road vehicles, in order to meet very demanding requirements of the kind encountered in the area of military technology, for example. The advantage of the present invention lies in the fact that the proposed carrier extends inside the closed cross-section from a first internal surface of the vehicle frame and/or the closed cross-sectional profile to at least a second internal surface of the vehicle frame. The vehicle frame in this case is formed of longitudinal members, which are formed in full or in part of a closed cross-sectional profile. Alternatively, the vehicle frame can also be formed of a cross-sectional profile that is constituted by a combination of an open and a closed cross-sectional profile.

If the carrier extends between the two internal surfaces of the vehicle frame, it will support the internal surfaces of the vehicle frame against one another. What this means is that, if one side of the profile is placed under load, the carrier will convey the forces acting upon it to the other internal surface, against which the carrier makes bearing contact. Provision is also made for the carrier to constitute a preferably through opening to carry the fastening device, which opening extends through the entirety of the closed cross-sectional profile of the vehicle frame. In an especially preferred and simple embodiment, the opening is executed as a circular through opening or drilled hole or bore to carry a threaded bolt. This means that the second cross-sectional profile of the carrier is provided as a circular opening to carry the fastening device, namely the threaded bolt. In this particularly simple variant of the invention, two simple holes as the entry to and the exit from the carrier through the closed cross-sectional profile, together with a bolt with a through drilled hole or bore, are accordingly adequate in order to realize the present invention. If a vehicle component, for example a longitudinal control arm bracket or a stabilizer support for running gear, is now attached to the vehicle frame, it can be attached to the closed cross-sectional profile through the use of a conventional bolted connection without the risk of the high contact forces of the bolted connection causing the closed cross-sectional profile to deform. The transmission of force to the components to be attached in the longitudinal direction of the carrier can thus take place exclusively through the contact surfaces of the components. The carrier itself is required only to introduce forces in the direction perpendicular to the longitudinal direction of the carrier through the fastening device and into the profile of the vehicle frame.

In accordance with another, especially preferred feature of the invention, provision is also made for the first and the second internal surfaces of the vehicle frame to be oriented preferably in parallel, but at an angle not exceeding ±90°, in relation to one another. In these selected configurations, the carrier can achieve a particularly good supporting effect on the sides of the profile in relation to one another.

In accordance with a further, especially preferred feature of the invention, provision is made for the vehicle frame to be provided at least partially as a closed cross-sectional profile. The use of a closed cross-sectional profile enables the vehicle frame to have a particularly high torsional rigidity. This form of cross-sectional profile can be utilized advantageously, especially in the case of heavily stressed vehicles, such as military vehicles or construction vehicles.

In accordance with an added, likewise advantageous feature of the invention, the second cross-sectional profile is configured as a closed cross-sectional profile. The second cross-sectional profile is the cross-sectional profile of the carrier. As already mentioned above, in a particularly simple embodiment, a round bolt having a through drilled hole running parallel to its longitudinal axis can be selected as a particularly simple illustrative embodiment for a second cross-sectional profile of a carrier. In addition, however, the use of rectangular, triangular, polygonal or other cross-sectional profiles, for example, is also conceivable. The openings provided in the carrier to carry the fastening device can be configured optionally so that they are smooth, with or without a groove acting as a way of protection against rotation, or with or without a screw thread. A crucial factor in this embodiment, however, is that the second cross-sectional profile is also configured as a closed cross-sectional profile in order, in the assembled state, to seal the closed cross-sectional profile of the vehicle frame to the outside and to prevent the ingress of dirt or moisture.

In accordance with an additional, advantageous feature of the invention, for this purpose the vehicle frame and the carrier are connected in such a way that they are at least watertight and/or gastight. This is intended to prevent the ingress of dirt, salt water, moisture and other undesired elements into the area of the closed cross-sectional profile of the vehicle frame. This contributes to durability, with the aim of enabling the vehicle frame to also be operated without restriction over a period of many years.

In accordance with again another, preferred feature of the invention, the carrier projects beyond one external surface of the vehicle frame. This enables the force transmission point to be located remotely from the external surface of the vehicle frame. As a result, tensioning forces that are applied by the utilized bolted connections are not introduced into the closed cross-sectional profile of the vehicle frame, but are absorbed by the carrier for the fastening device. Deformations of the closed cross-sectional profile of the vehicle frame can thus be prevented, and the transmission of force takes place only through the defined connection points between the carrier and the vehicle frame. In addition, it is possible in this way to attach the carrier in a particularly simple manner so that it is gastight and watertight through the use of welded joints situated on the outside of the vehicle frame.

In accordance with again a further feature of the invention, in order to take the various requirements into account, it is advantageous in this context for the carrier and the vehicle frame to be manufactured from different materials. The carriers can thus be manufactured from particularly high-strength steel, whereas the profile of the vehicle frame is manufactured from conventional and significantly less expensive materials.

In accordance with again an added feature of the invention, the fastening assembly in this case advantageously provides for the carrier and the vehicle frame to be attached to one another or sealed through the use of a pressed connection, welded connection or adhesive bond. Depending on the particular application, the connection between the carrier and the vehicle frame can thus be used for securing the carrier to the vehicle frame and/or for sealing between the carrier and the vehicle frame. In particular, by welding the carrier to the vehicle frame, it is possible to ensure that the closed profile of the vehicle frame is not caused to open outwards by the section of the carrier passing through it. The seal in this case can be effected optionally by welding, by pressing or by crushing. In the case of relatively soft materials for the carrier, the carrier can be crushed to such an extent that it fits tightly against a through opening in the vehicle frame. However, the use of sealants can be envisaged as an alternative. The sealants are compressed in a sealing manner in conjunction with closing the fastening device, for example by turning the bolted connection.

With the objects of the invention in view, there is concomitantly provided an off-road utility vehicle, comprising at least one fastening assembly configured according to the invention, in which the vehicle frame has an at least partially closed cross-sectional profile.

Such a vehicle has a particularly torsionally rigid vehicle frame which, in spite of having built-in components, has no deficiencies of any kind with regard to the characteristics of the closed cross-sectional profile.

Other features which are considered as characteristic for the invention are set forth in the appended claims, noting that the features listed individually in the dependent claims can be combined with one another in any technologically appropriate manner and define further embodiments of the invention. In addition, the features indicated in the claims are specified more precisely and explained in the description, in conjunction with which further preferred illustrative embodiments of the invention are presented.

Although the invention is illustrated and described herein as embodied in a fastening assembly for mounting components and an off-road utility vehicle having a fastening assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
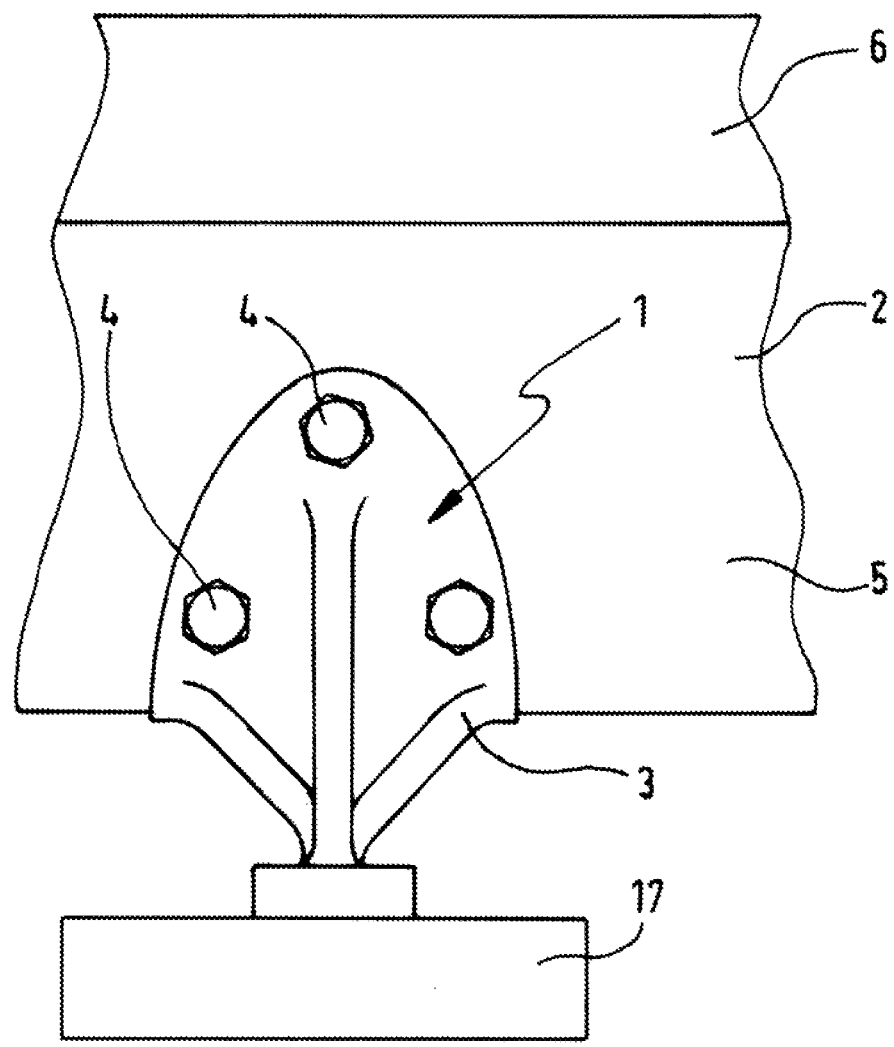
FIG. 1 is a fragmentary, diagrammatic, side-elevational view of a first illustrative embodiment of the invention.

Referring now in detail to the figures of the drawing for explaining the invention and the technical field in more detail by showing particularly preferred structural variants to which the invention is not restricted, and first, particularly, to FIG. 1 thereof, there is seen a side view of a first illustrative embodiment of a fastening assembly 1 according to the invention. In this case, a vehicle frame 2 is depicted in section as a side view. A component 3 is attached to the vehicle frame 2 through the use of bolts 4.

Figure 2:
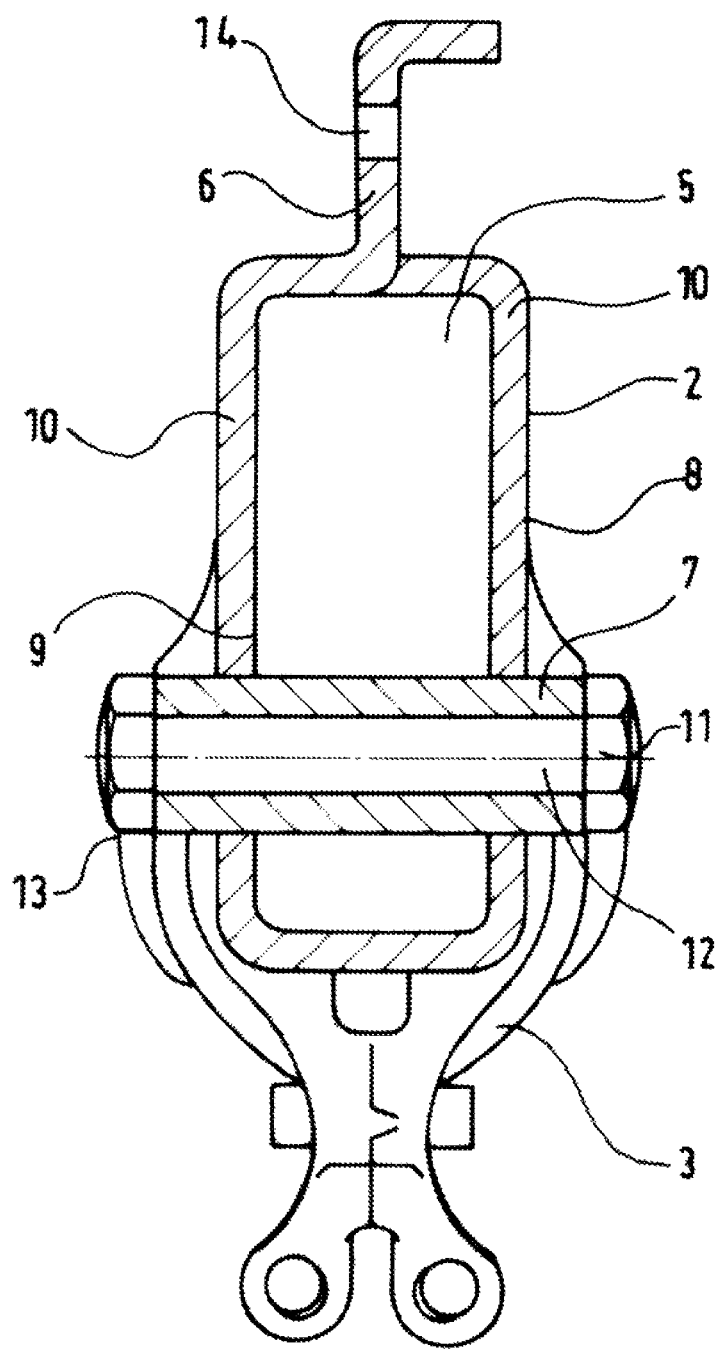
FIG. 2 is a cross-sectional view of the illustrative embodiment according to FIG. 1.

The vehicle frame 2 according to FIG. 1 is depicted once again in FIG. 2 in a cross-sectional view. It can be readily appreciated in this case that the vehicle frame 2 is formed of a closed cross-sectional profile 5 and an open cross-sectional profile 6. Projecting through the closed cross-sectional profile 5 is a carrier 7, which extends from a first internal surface 8 to a second internal surface 9. The carrier, receptacle or mount 7 projects laterally in each case through an external surface 10. The component 3, which is depicted on the underside, engages around the vehicle frame 2 in an approximately U-shaped manner. The carrier 7, for its part, is configured as a circular bolt with a through hole, through which a fastening device 11 projects. The through hole or drilled hole in this case constitutes an opening 12 for carrying the fastening device. In the illustrative embodiment depicted in FIG. 2, the carrier 7 is simply inserted through entry openings 13 in the closed cross-sectional profile 5 and is not connected thereto in any other way. Nevertheless, it is still possible to achieve the advantage according to the invention that no deformation of the closed cross-sectional profile 5 occurs in conjunction with tightening of the fastening device 11 and, in conjunction with the application of loadings through the components 3, which are transferred either through the contact surface of the component 3 onto the vehicle frame 2 or through the carrier 7 into the through holes or openings 13. If necessary, the carrier can be crushed by compressive forces in conjunction with tightening to such an extent that it bears tightly against the vehicle frame 2.

Figure 3:
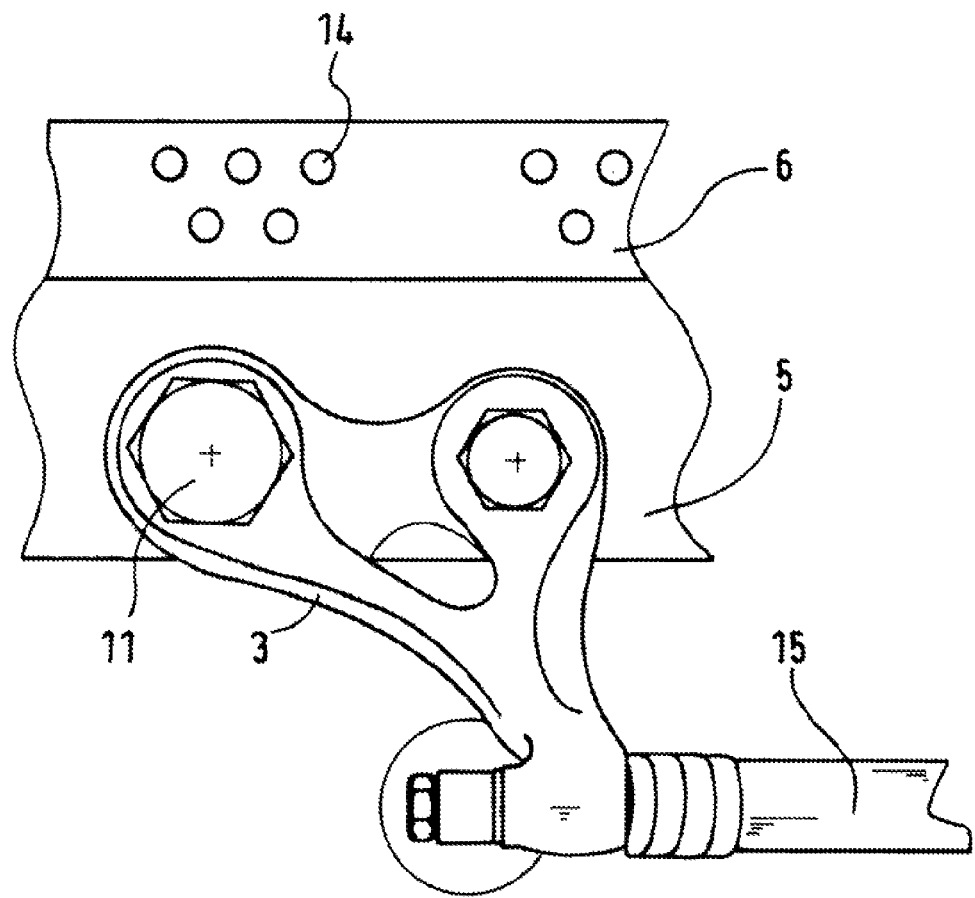
FIG. 3 is a fragmentary, side-elevational view of a second illustrative embodiment of the invention.

FIG. 3 depicts another illustrative embodiment according to the invention as a side view, in which a vehicle frame 2 includes a closed cross-sectional profile 5 in the lower area and an open cross-sectional profile 6 in the upper area. The open cross-sectional profile 6 in this case is provided with various drilled holes 14. The component 3 in this embodiment is used to carry a connecting rod 15. In this embodiment, too, bolted connections are again selected as fastening devices 11, although the use of other appropriate fastening devices is possible in the context of the invention.

Figure 4:
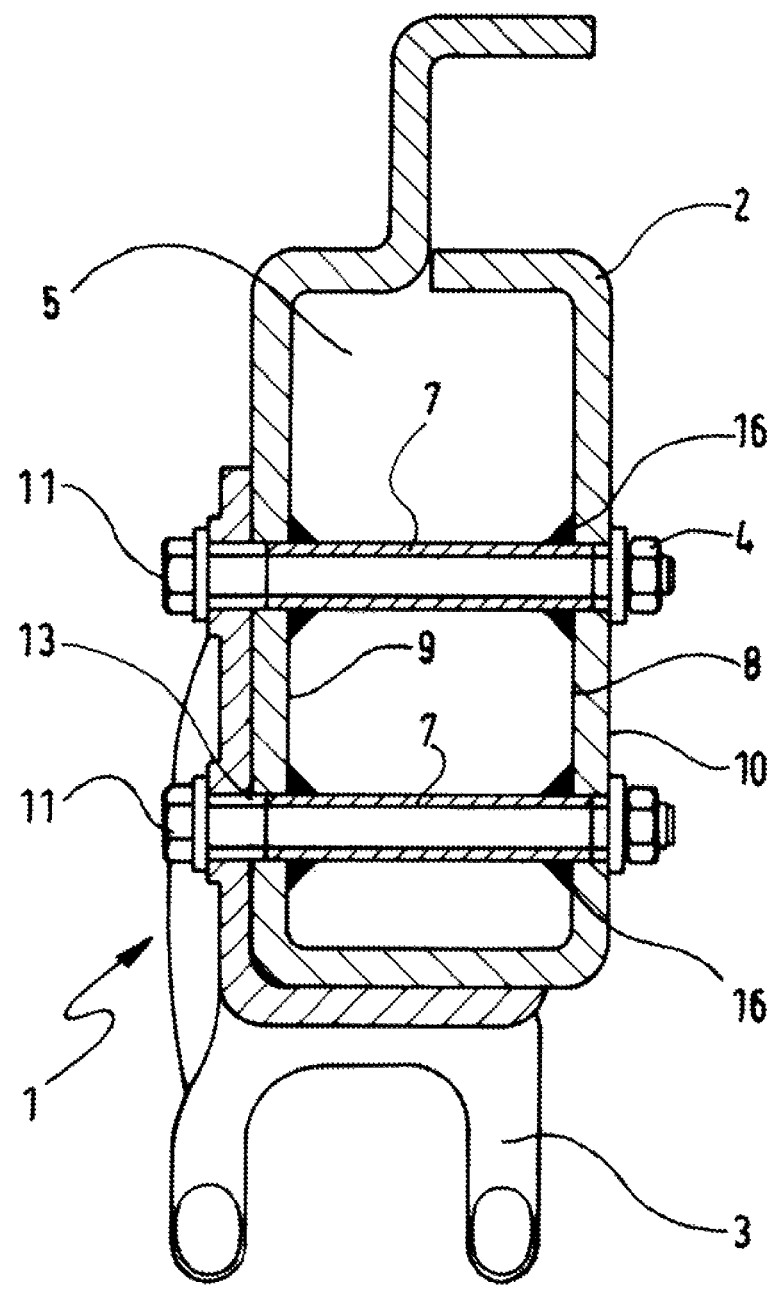
FIG. 4 is a cross-sectional view of a third illustrative embodiment of the invention.

FIG. 4, finally, depicts the embodiment according to FIG. 1 in a lateral sectioned view, in which the component 3 engages in an L-shaped manner around the closed cross-sectional profile 5 of the vehicle frame 2. The fastening devices 4 in this case are disposed in two rows, with the bolts 11 being formed of screws and nuts passing through the first internal surface 8 and the second internal surface 9 in an orthogonal direction. The same is true of the carriers 7, which enclose the bolts 11.

The fastening assembly 1 according to the invention in this embodiment includes carriers 7 which are connected to the vehicle frame through the use of welded joints 16. In the embodiment depicted in this figure, the carriers 7 extend to the external surface 10 of the closed cross-sectional profile 5. Any transmission of force onto the external surface 10 of the closed profile 5 thus results in the transmission of force into the carrier 7 and thus to support on the opposing internal surfaces 8 or 9.

The carrier 7 is welded through the use of the welded joint 16 or adhesively bonded, preferably at the through hole or opening 13.

It should be noted, furthermore, that the present invention is not restricted to the depicted illustrative embodiments. To be more precise, rather, numerous adaptations of the invention are possible within the scope of the claims. A person skilled in the art will realize that welded joints other than those described can be used in conjunction with the present invention.

The invention claimed is:

1. A fastening assembly, comprising:
   a vehicle frame for at least one component part to be fastened to said vehicle frame, said vehicle frame having first and second internal surfaces and a first closed cross-sectional profile;
   at least one carrier having an opening for carrying a fastening device, said at least one carrier extending from said first internal surface to at least said second internal surface, said at least one carrier extending through and beyond the component part, and said at least one carrier having a closed second cross-sectional profile;
   a fastening element passing through said at least one carrier element, said fastening element crushing said at least one carrier element and forcing a contact surface of the component part tightly against said frame;
   said vehicle frame and said at least one carrier having at least one of a watertight or gastight connection for sealing said first cross-sectional profile and an interior of said vehicle frame to an outside of said vehicle frame.

2. The fastening assembly according to claim 1, wherein said first and second internal surfaces of said vehicle frame are oriented parallel to each other.

3. The fastening assembly according to claim 1, wherein said first and second internal surfaces of said vehicle frame form an angle with each other not exceeding ±90°.

4. The fastening assembly according to claim 1, wherein said at least one carrier and said vehicle frame are manufactured from different materials.

5. The fastening assembly according to claim 1, wherein said at least one carrier and said vehicle frame are connected to one another or sealed by a pressed connection, a welded connection or an adhesive bond.

6. An off-road utility vehicle, comprising:
   at least one fastening assembly according to claim 1; said vehicle frame of said at least one fastening assembly being a closed cross-sectional profile.

7. The fastening assembly according to claim 1, wherein said vehicle frame has an external side beyond which said at least one carrier projects.

8. The fastening assembly according to claim 1, wherein said watertight or gastight connection is a weld provided inside said frame.

9. A fastening assembly, comprising:
   a vehicle frame for at least one component part to be fastened to said vehicle frame, said vehicle frame having first and second internal surfaces and a first closed cross-sectional profile;
   at least one carrier having an opening for carrying a fastening device, said at least one carrier extending from said first internal surface to at least said second internal surface, said at least one carrier extending through and beyond the component part, and said at least one carrier having a closed second cross-sectional profile;
   a fastening element passing through said at least one carrier element, said fastening element crushing said at least one carrier element and forcing a contact surface of the component part tightly against said frame; and
   said vehicle frame and said at least one carrier having at least one of a watertight or gastight connection for sealing said first cross-sectional profile and an interior of said vehicle frame to an outside of said vehicle frame, said vehicle frame has an external side beyond which said at least one carrier projects.

10. The fastening assembly according to claim 9, wherein said watertight or gastight connection is a weld provided inside said frame.

11. A fastening assembly, comprising:
   a vehicle frame having first and second internal surfaces and a first closed cross-sectional profile, said closed cross-sectional profile providing said vehicle frame with a high torsional rigidity sufficient for a heavily stressed vehicle;

at least one component part for being mounted on said vehicle frame;

at least one carrier having an opening for carrying a fastening device, said at least one carrier extending from said first internal surface to at least said second internal surface, said at least one carrier extending through and beyond the component part, and said at least one carrier having a closed second cross-sectional profile;

a fastening element passing through said at least one carrier element, said fastening element crushing said at least one carrier element and forcing a contact surface of the component part tightly against said frame; and said vehicle frame and said at least one carrier having a fluid tight connection for sealing said first cross-sectional profile and an interior of said vehicle frame to an outside of said vehicle frame.

12. The fastening assembly according to claim 11, wherein said heavily stressed vehicle is a military vehicle, construction vehicle, or off-road vehicle.

13. The fastening assembly according to claim 11, wherein said watertight or gastight connection is a weld provided inside said frame.

* * * * *